No. 847,918. PATENTED MAR. 19, 1907.
W. H. DONALDSON.
HEADLIGHT OPERATING DEVICE.
APPLICATION FILED JAN. 10, 1906.
2 SHEETS—SHEET 1.
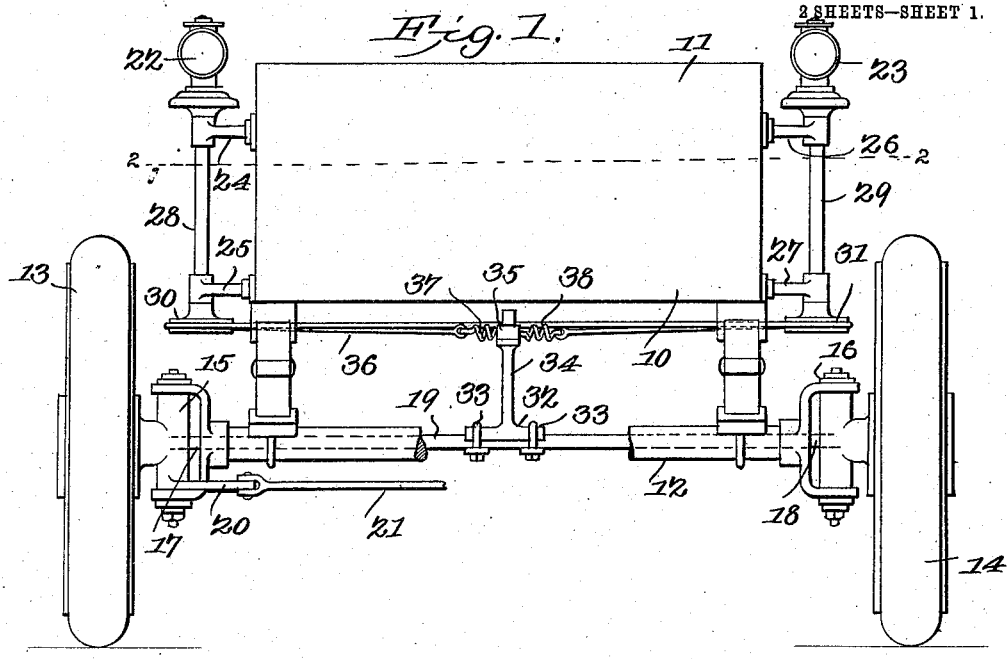
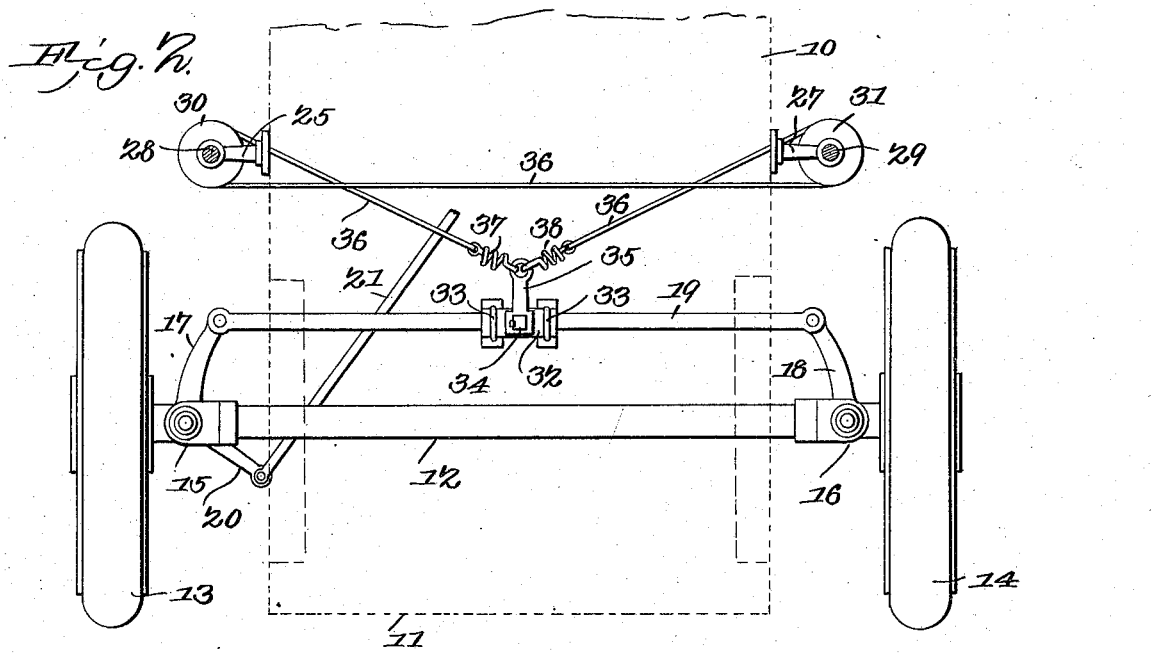
Witnesses
E. F. Stewart
C. N. Woodward
William H. Donaldson,
Inventor,
by C. A. Snow & Co.
Attorneys No. 847,918. PATENTED MAR. 19, 1907.
W. H. DONALDSON.
HEADLIGHT OPERATING DEVICE.
APPLICATION FILED JAN. 10, 1906.
2 SHEETS—SHEET 2.
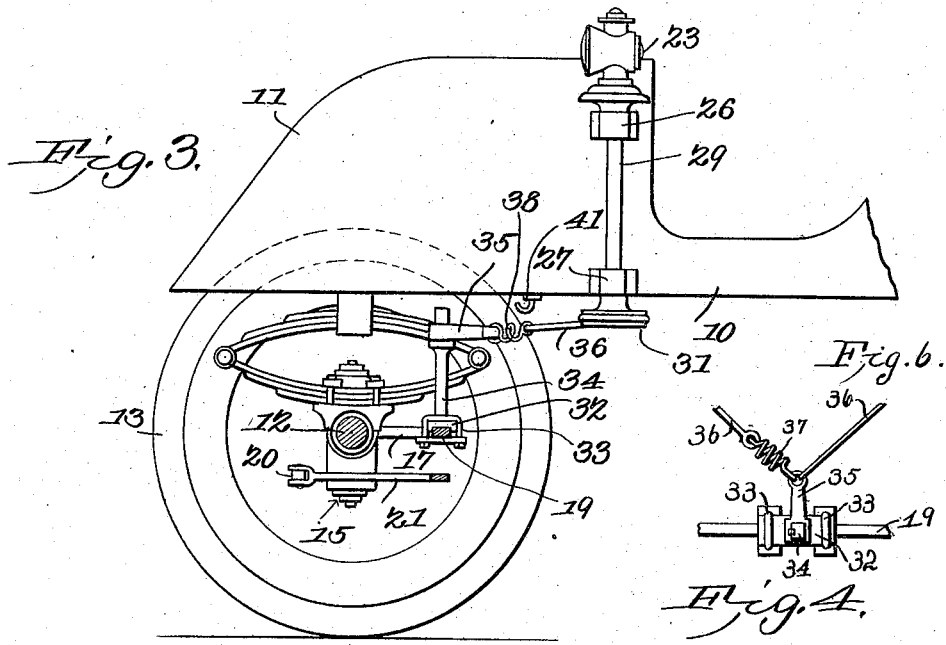
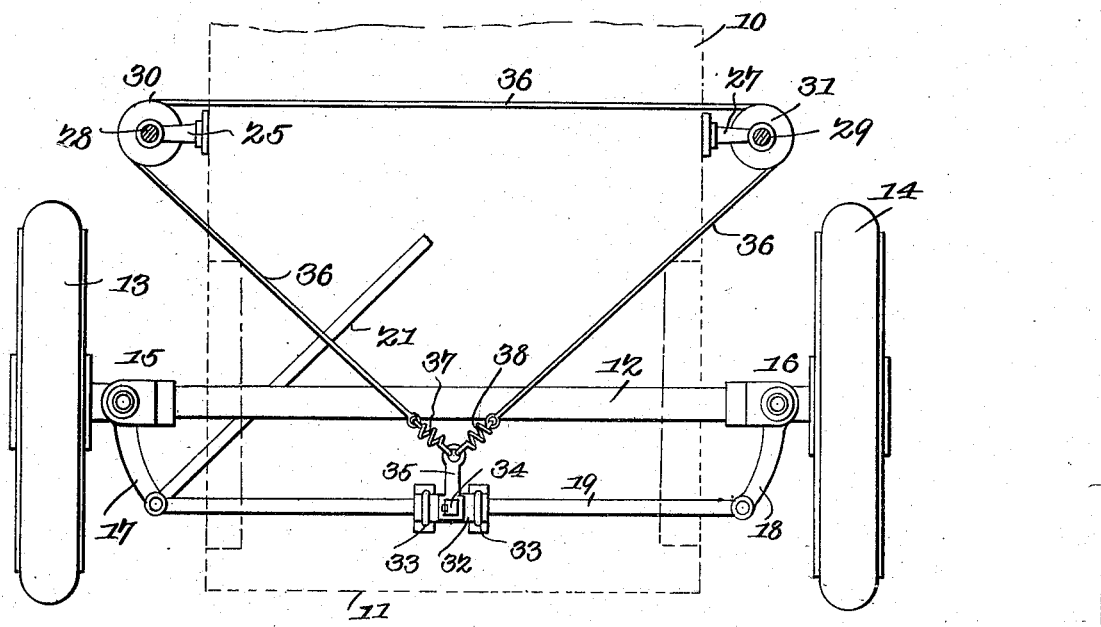
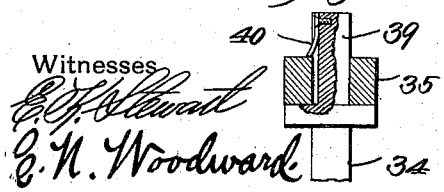
Witnesses
William H. Donaldson,
Inventor,
by C. A. Snow & Co
Attorneys

UNITED STATES PATENT OFFICE.

WILLIAM H. DONALDSON, OF JOLIET, ILLINOIS.

HEADLIGHT-OPERATING DEVICE.

No. 847,918.

Specification of Letters Patent.

Patented March 19, 1907.

Application filed January 10, 1906. Serial No. 295,446.

*To all whom it may concern:*

Be it known that I, WILLIAM H. DONALDSON, a citizen of the United States, residing at Joliet, in the county of Will and State of Illinois, have invented a new and useful Headlight-Operating Device, of which the following is a specification.

This invention relates to automobiles and similar vehicles, and has for its object to produce a simply-constructed attachment whereby the headlights may be caused to follow the line of movement of the vehicle in all the changes of direction which it may pursue.

With these and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

In the drawings, Figure 1 is a front elevation of a portion of an automobile of conventional form with the improvements applied. Fig. 2 is a plan view in section on the line 2 2 of Fig. 1 with the body of the vehicle in dotted lines. Fig. 3 is a side elevation of the parts shown in Fig. 1. Fig. 4 is a view similar to Fig. 2, illustrating the application of the improvement to a slightly-different arrangement of the steering-gear. Fig. 5 is an enlarged sectional detail illustrating the construction and operation of the coupling mechanism between the lamp-operating means and the steering means. Fig. 6 is a detail illustrating a modified construction of a portion of the steering means.

The improved device may be readily adapted without material modifications to all the various forms of automobiles manufactured and to the lamps of such vehicles wherever located thereon. In some forms of such vehicles the lamps are located upon the front of the forward hood portion, sometimes at the rear of the hood portion, sometimes upon the supporting-frame, and at other points; but for the purpose of illustration the lamps in the drawings are shown at the rear end of the forward hood portion, a common practice in automobile construction.

The body of the automobile is represented at 10, the forward hood or covering for the motive power and other parts at 11, the forward axle at 12, the forward wheels at 13 14, coupled to the axle in the usual manner by the swivel-joints 15 16, the latter having the lateral arms 17 18 coupled by the rod 19 and with an arm 20, carrying the steering-rod 21, the mechanism for operating the same not being illustrated, as it forms no part of the present invention.

The lamps (represented at 22 23) are mounted to rotate in spaced brackets 24, 25, 26, and 27 by rods 28 29, depending from the lamps and provided with cable-sheaves 30 31 at their lower ends.

Bearing upon the coupling-rod 19 is a plate 32, attached to the rod, as by clips 33, and with a standard 34 rising therefrom. Detachably connected to the upper end of the standard 34 is an arm 35, extending laterally from the same.

A cable 36 extends around the sheaves 30 31 and is connected at the ends to springs 37 38, which are in turn connected to the free end of the arm 35.

The upper end of the standard is formed into a square terminal stud, as at 39, or of other irregular form to enter a correspondingly-shaped aperture in the arm 35, so that the latter will not rotate upon the standard, and the standard is also provided with a spring-catch, as at 40 in Fig. 5, to hold the arm yieldably connected to the standard. The arm is thus easily attached to or detached from the standard when required, and a hook 41 is attached to the under side of the body 10 to receive and support the arm 35 when released—as, for instance, in the day-time, when the lamps are not in use and do not require to be moved.

In some classes of automobiles the connecting-rod 19 is disposed rearwardly of the forward axle, as in Figs. 1, 2, and 3, while in others the rod is forward of the axle, as in Fig. 4, and the only change required in the arrangement of the parts to adapt the improved device to either form of construction is to lead the cable 36 to the opposite sides of the sheaves, as shown. By this simple arrangement it will be obvious that when the vehicle is moving in a straight line, as in Figs. 1, 2, 3, and 4, the lamps will be held parallel to the line of movement or in position to throw the light straight ahead.

If the vehicle is turned to either side, as when moving on curves or when turning corners or turning the vehicle around, the lamps will be partly rotated, corresponding to the lateral movement of the wheels, and cause the rays of light from the lamps to follow the path over which the vehicle is about to move, and thus constantly illuminate the path ahead of the vehicle.

The device thus operates automatically and without the necessity for the attention of the operator to manipulate the lamps.

The device is simple in construction, can be inexpensively manufactured, and applied to the automobile without change in the structure of any of the parts.

If preferred, one spring only may be employed between the arm 35 and the cable 36, as shown in Fig. 6.

It will be observed that a feature of great importance in my invention lies in the fact that the attachment may be applied without change in the construction of the vehicle or the attachment to the various types of steering apparatus now in use. Where the lamps are in rear of the front axle and the cross-bar of the steering-gear is in front of the axle, as shown in Fig. 4, the operating cable or chain is arranged in a simple triangular form, the main part of the cable being extended across under the vehicle and the two end portions extended forwardly and inwardly to the part which connects them to the post, while in the type of steering-gear in which the connecting-rod is behind the axle, as in Figs. 1, 2, and 3, the end portions of the cable are carried rearwardly around the pulleys, so that when they are extended forwardly and inwardly to the connection 35 both these end portions will cross the main part of the cable, so that the headlights will be shifted in the opposite direction from the movement of the connecting-bar. Of course where the lamps are in front of the axle the arrangement of the cable will be reversed in order that in one case the lamps will be turned in the same direction as the rod is moved and in the other case in the opposite direction from the movement of the connecting-bar.

It will be observed also that a feature of importance lies in the fact that my construction permits ready disconnection of the operating devices from the steering-gear and the locking of the lamps in the straight-ahead position by hanging the arm 35 on the hook 41, depending from the vehicle. In this way, if for any reason the chauffeur desires to destroy the dirigible function of the parts he may do so instantly and without the use of tools and may at the same time lock the lamps in their normal straight-ahead position.

Having thus described the invention, what is claimed is—

1. The combination with the body of a motor-vehicle, the steering apparatus associated with said body including a rod extending between the steering-arms of the forward axle, a standard extending from said rod and having an irregular terminal stud provided with a longitudinal recess, a yielding catch connected to the said stud within said recess, an arm having a socket for receiving said stud and bearing beneath said catch, lamps movably connected to said body, and connecting means between said lamps and arm.

2. In combination with a vehicle provided with a steering-gear which embodies a transverse connecting-rod, a pair of vertical shafts journaled at the sides of the vehicle and each carrying a headlight at its upper end and a pulley at its lower end, the pulleys being below the bottom of the vehicle, a post supported on and detachably attached to said cross-rod about midway its length, a rearwardly-extending arm detachably connected to said post, a hook depending from the bottom of the vehicle and adapted to receive and hold said arm when the same is detached from the post, and a cable extending across under the vehicle and passing around the pulleys and having its end portions extending inwardly and attached to said arm, for the purposes herein set forth.

3. In combination with a vehicle provided with a front-wheel steering-gear embodying a transverse connecting-rod, a vertical shaft at each side of the vehicle carrying a headlight and a pulley, the pulley being on the lower end of the shaft, a post attached to the connecting-rod about midway its length and rising to a point about level with the pulleys, a cable extending across under the vehicle and passing freely around both pulleys and extending from the pulleys inwardly, and means connecting the inner ends of said cable to the top of the aforesaid post.

4. In combination with a vehicle provided with a steering-gear embodying an endwisely-shiftable transverse rod, a vertical shaft at each side of the vehicle carrying a headlight and a sheave or pulley, a cable extending transversely of the vehicle and carried around both of said pulleys and extending inwardly toward said connecting-rod, means detachably connecting the inner ends of the cable to said connecting-rod, and a device on the vehicle for locking the cable against movement when it is detached from the steering-gear.

In testimony that I claim the foregoing as my own I have hereto affixed my signature in the presence of two witnesses.

WILLIAM H. DONALDSON.

Witnesses:
JOHN T. WHITE,
HOMER R. CLARK.